United States Patent
Zhu et al.

(10) Patent No.: US 8,054,817 B2
(45) Date of Patent: Nov. 8, 2011

(54) LEGACY AND NEW WIRELESS COMMUNICATION DEVICE COEXISTING AMBLE SEQUENCE

(75) Inventors: Chenxi Zhu, Gaithersburg, MD (US); Wei-Peng Chen, Santa Clara, CA (US); Jonathan Agre, Brinklow, MD (US)

(73) Assignee: Fujitsu Limited, Kawasaki (JP)

( * ) Notice: Subject to any disclaimer, the term of this patent is extended or adjusted under 35 U.S.C. 154(b) by 969 days.

(21) Appl. No.: 11/830,929

(22) Filed: Jul. 31, 2007

(65) Prior Publication Data

US 2008/0186899 A1 Aug. 7, 2008

Related U.S. Application Data

(60) Provisional application No. 60/822,861, filed on Aug. 18, 2006, provisional application No. 60/822,791, filed on Aug. 18, 2006.

(51) Int. Cl.
*H04J 1/00* (2006.01)

(52) U.S. Cl. .......................................... 370/343

(58) Field of Classification Search ................ 370/343, 370/347, 350, 349, 341, 319, 394, 537, 295, 370/276, 281, 441, 342; 375/145, 149; 708/250, 708/252

See application file for complete search history.

(56) References Cited

U.S. PATENT DOCUMENTS

| | | | |
|---|---|---|---|
| 7,013,135 B2 | 3/2006 | Hiramatsu | |
| 7,024,331 B2 | 4/2006 | Jones et al. | |
| 7,027,444 B2 * | 4/2006 | Kim et al. | 370/394 |
| 7,068,631 B2 | 6/2006 | Eriksson et al. | |
| 7,616,593 B2 * | 11/2009 | Jung et al. | 370/310 |
| 7,616,679 B2 * | 11/2009 | Choi et al. | 375/147 |
| 7,804,804 B2 * | 9/2010 | Sugaya et al. | 370/338 |
| 2004/0008614 A1 | 1/2004 | Matsuoka et al. | |
| 2004/0208253 A1 | 10/2004 | Joo | |
| 2005/0233709 A1 * | 10/2005 | Gardner et al. | 455/101 |
| 2006/0153282 A1 | 7/2006 | Jung et al. | |

FOREIGN PATENT DOCUMENTS

| | | |
|---|---|---|
| JP | 2004515112 | 5/2004 |
| WO | 0243279 | 5/2002 |
| WO | 2005119922 | 12/2005 |

OTHER PUBLICATIONS

International Search Report and Written Opinion of ISA, mailed Feb. 26, 2008 and issued in corresponding International Patent Application No. PCT/US07/74861 (10 pages).

First Korean Office Action mailed Aug. 20, 2010 in corresponding Korean Patent Application No. 10-2009-7005583, 5 pages (4 pages of English translation).

(Continued)

*Primary Examiner* — Chi Pham
*Assistant Examiner* — Alexander Boayke
(74) *Attorney, Agent, or Firm* — Staas & Halsey LLP

(57) ABSTRACT

The embodiments generate a new type of amble sequence for a wireless communication network with mixed nodes, by generating a first amble sequence invisible to a first node based upon an existing amble sequence for the first node and generating a second amble sequence having a low to zero cross-correlation with the first amble sequence, based upon the first amble sequence. The first and second amble sequences can be broadcast in alternating communication link frames.

20 Claims, 5 Drawing Sheets

OTHER PUBLICATIONS

International Preliminary Report on Patentability (Chapter I of PCT) including the Written Opinion of the International Searching Authority issued on Mar. 5, 2009 and Feb. 26, 2008, respectively, in corresponding International Application No. PCT/US2007/074861 filed Jul. 31, 2007 (7pp).

Korean Notice of Final Rejection issued Jan. 24, 2011 in corresponding Korean Patent Application No. 10-2009-7005583 (2 pages)(1 page English Translation).

Korean Notice of Allowance issued on Mar. 29, 2011 in corresponding Korean Application No. 10-2009-7005583 (2 pages).

Japanese Office Action issued May 31, 2011 in related Japanese Patent Application No. 2009-525681 (5 pages).

* cited by examiner

LEGACY AND NEW WIRELESS COMMUNICATION DEVICE COEXISTING AMBLE SEQUENCE

CROSS-REFERENCE TO RELATED APPLICATION(S)

This application is related to and claims priority to U.S. provisional application entitled MANAGING A WIRELESS NETWORK having Ser. No. 60/822,861, by Chenxi Zhu, Wei-Peng Chen and Jonathan Agre, filed Aug. 18, 2006 and related to and claims priority to U.S. provisional application No. 60/822,791 filed Aug. 18, 2006, all of which are incorporated by reference herein.

BACKGROUND

1. Field

The embodiments discussed herein relate to wireless communication device/network amble sequence or synchronization symbols.

2. Description of the Related Art

Preambles are often used in wireless networks for network identification, time and frequency synchronization of wireless communication devices with the network, and/or channel estimation. In wireless cellular networks, preambles are symbols known by the wireless communication devices. A first device, like a wireless network infrastructure device (a base station in cellular network for example), broadcasts (transmits) well known to the device amble sequences periodically in a fixed location (often the beginning of the frame and called preamble) of every frame. A second wireless communication device looks for preambles to find nearby first devices and to get time synchronization and frequency synchronization with the wireless network.

Sometimes it is necessary to introduce new amble sequences into a wireless communication system for a new type of wireless communication device. A possible reason for having to introduce new amble sequence for new devices is that due to some limit of the system design, the new devices might have a need to receive amble sequences other than the legacy preamble. Both new devices and legacy devices can coexist in the same network, where legacy devices are designed to recognize only the old preambles. It is important that any new amble sequences designed to be recognizable to the new devices do not cause confusion to the legacy devices.

SUMMARY

It is an aspect of the embodiments discussed herein to provide new and legacy wireless communication devices coexisting wireless communication amble sequence or synchronization symbol (hereinafter referred to as an amble sequence or simply an amble), broadcasted or transmitted at any fixed or known location with respect to a wirelessly communicated data frame, such as (without limitation) a preamble(s), a midamble(s), a postamble(s), or any combinations thereof.

According to an aspect of an embodiment, the wireless network broadcasts (transmits) both the legacy ambles and new ambles to support both legacy wireless communication devices and new wireless communication devices. A legacy or existing wireless communication device should not get confused by or should not recognize or lock on a new wirelessly transmitted amble targeted for the new wireless communication devices.

According to an aspect of an embodiment, a new type of amble sequence for wireless communication network with mixed wireless communication nodes (devices) is constructed. The new amble sequence is visible to some nodes while invisible to other nodes. According to an aspect of an embodiment, a wireless communication network generates a new wirelessly broadcasted or transmitted amble sequence, such as a preamble, midamble, postamble, or any other special wireless communication synchronization symbol, recognizable only by the new wireless communication device, but not recognizable by the legacy wireless communication device, so the legacy wireless communication devices will not be confused by new symbols.

The embodiments generate an amble sequence in a wireless network having a first amble sequence by generating a second amble sequence in a frequency domain having a low correlation with the first amble sequence, and generating a third amble sequence based upon the second amble sequence and having a low correlation with the second amble sequence.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

Figure 1:
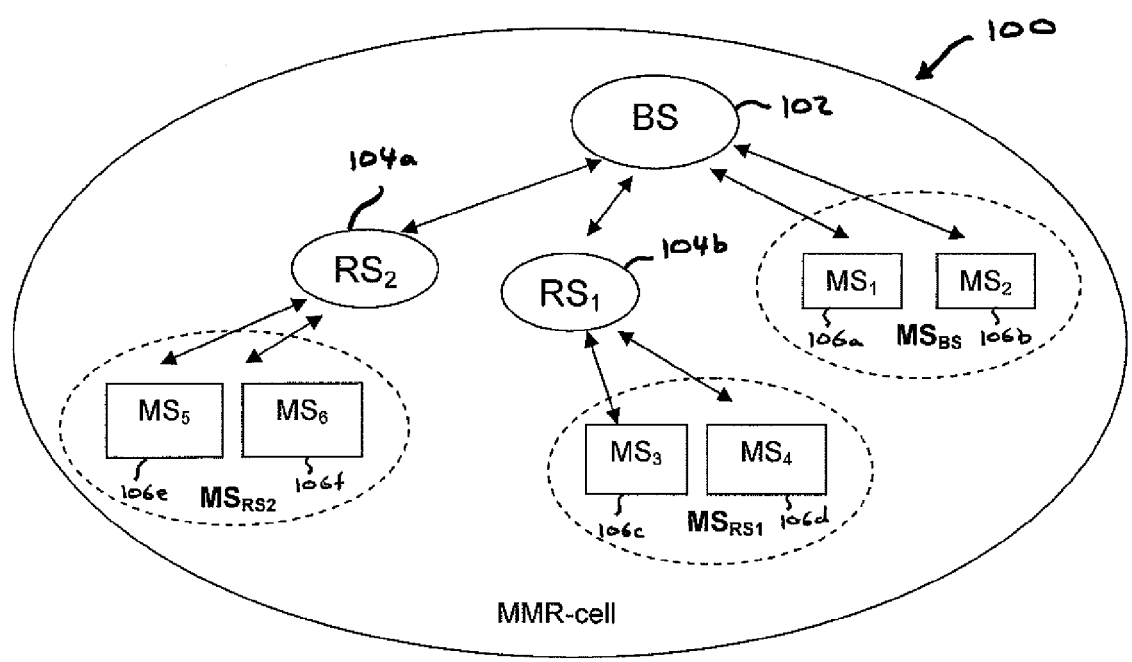
FIG. 1 is a diagram of a Mobile Multi-hop Relay-Based Cell (MMR-cell).

The embodiments generate a new type of amble sequence for a wireless communication network with mixed nodes, by generating, based upon the existing amble sequences for a first node, a first amble sequence invisible to the first node, and generating a second amble sequence having a low to zero cross-correlation with the first amble sequence, based upon the first amble sequence. The first and second amble sequences are broadcast in alternating communication link frames.

The embodiments can be included in any wireless communication network using Orthogonal Frequency Division Multiplexing (OFDM) at the physical layer. The embodiments are not limited to but can be included in any Broadband Wireless Access Standards, such as (without limitation) IEEE 802.16 standards (also known as Worldwide Interoperability for Microwave Access (WiMAX) networks), and which at the physical layer specify various network access specifications based upon Frequency Division Duplex (FDD) systems, such as (without limitation) orthogonal frequency division multiplexing (OFDM), orthogonal frequency-division Multiple Access (OFDMA), frequency division multiplexing (FDM), and/or frequency division multiple access (FDMA).

in a wireless communication cellular network, for example, a WiMAX wireless cellular network, using radio relays can be an effective way to increase the signal quality of the users by replacing a long, low quality wireless communication link between a. Base Station (BS) and a Mobile/Subscriber Station (MS/SS) (hereinafter referred to as MS) with multiple shorter, high quality links through one or multiple Relay Stations (RSs). As relay stations do not require their own wired backhauls, and are often less sophisticated than a full functional BS, relay stations are less expensive to deploy and operate than a traditional BS. A relay station could extend the service of the BS to coverage holes where users would otherwise not get services, and extend the effective cell size of a BS. A relay station could also be used to improve the Carrier to Interference-plus-Noise Ratio (CINR) and Quality of Service (QoS) of the users and enhance the cell capacity.

A relay technique can be by IEEE 802.16 standard, including in the 802.16j Relay working group. In IEEE 802.16j standard, a relay station communicates to the BS like a MS, and communicates with the MS in its coverage area (called RS-microcell) like a BS. The overall service coverage area of a BS and all the associated RSs can be called a Mobile Multi-hop Relay-Based Cell (MMR-cell or MMR network).

According to an aspect of an embodiment, a new amble sequence can be generated for wireless communication networks having coexisting new and legacy (existing) wireless communication devices. One example embodiment generates a new amble sequence for the WiMAX mobile multihop relay network (MMR-cell), where a Relay Station (RS) as new type of wireless communication device is introduced and needs wireless communication synchronization with the base station (BS) and/or other RSs through the new amble sequence, while legacy or existing wireless communication devices, such as mobile stations (e.g., wireless phones, wireless personal digital assistants, wireless media players, etc.) should not be confused by or should not unnecessarily recognize the new amble sequence targeted for the new RSs.

According to an aspect of an embodiment, a wireless communication amble sequence or synchronization symbol (hereinafter referred to as an amble sequence or simply an amble) is any wirelessly transmitted signal, modulated sequence of binary bits (e.g., 0, 1, typically converted to −1, +1), pulses, or any combinations thereof used in a wireless communication network for any type of wireless communication synchronization by wireless communication devices/systems, including (without limitation) identification (e.g., network identification, wireless device identification, etc.), time and/or frequency synchronization, estimation (e.g., channel estimation), calibration, etc.

The embodiments apply to a wireless communication network using FDD and/or TDD and with mixed nodes, in which first nodes might require a first amble sequence and other second nodes might require a second amble sequence while the first amble sequence is invisible to the second nodes, and any combinations of such first and second amble sequences being visible and/or invisible to any number of nodes from among the mixed nodes. In one example embodiment, FIG. 1 is a diagram of a topology of an MMR-cell 100 with a BS 102 and two relay stations (RS1 and RS2) 104a, 104b. The BS 102 is serving the $MS_{1-6}$ 106a-f in the set $MS_{BS}$ directly ($MS_1$ 106a and $MS_2$ 106b). Two relay stations ($RS_1$ 104a, $RS_2$ 104b) are used to extend the coverage of BS 102 and serve $MS_{3-6}$ 106c-f in the set $MS_{RS1}$ ($MS_3$ 106c, $MS_4$ 106d) and $MS_{RS2}$ ($MS_5$ 106e, $MS_6$ 106f). The MMR-cell 100 includes the coverage area of the BS 102 and all the RSs 104.

The embodiments are described based upon an amble sequence for an MMR-cell 100 using OFDM/OFDMA wireless network access at the physical layer and in which new (e.g., RS 104) and legacy (e.g., MS 106) wireless communication devices coexist. In FIG. 1, using an OFDM or OFDMA system as an example, when a new wireless communication device, for example, the RSs 104 are introduced, an old or existing amble sequence P, for example, the old preamble (called legacy preamble) is sent/transmitted by the BS as an OFDM symbol with a known modulated sequence, such as Binary Phase-Shift Keying (BPSK), Quadrature phase-shift keying (QPSK), Phase Shift-Keying (PSK), QPSK or Quadrature amplitude modulation (QAM), or any combinations thereof. The legacy preamble is recognizable or known by the MSs 106 as legacy wireless devices. Assuming the Fast Fourier Transform (FFT) size of the OFDM signal is $N_{FFT}$ and the number of actually used subcarrier is $N_{USED}$, in frequency domain the legacy preamble symbol can be represented only in the used subcarriers:

$$P=[p_1, \ldots, p_i, \ldots p_{N_{USED}}] \quad (1)$$

The component of $p_i$ of the vector P is a complex number corresponding to (selected from) the constellation points of the modulation scheme. For example, $p_i \in \{-1,1\}$ for BPSK modulation and $p_i \in \{-1,i,1,-i\}$ for QPSK modulation (subject to arbitrary phase rotation). A different vector P can correspond to a different amble sequence. In Equation (1), i is index of used OFDM/OFDMA sub-carrier number. Q can be the time domain signal of the amble sequence P, $T=1/\Delta f$ (i.e., time duration of an amble sequence before appending guard time). $\Delta f$ can be OFDM/OFDMA spacing of two adjacent subcarriers in the OFDM/OFDMA system. Assuming the i-th element of sequence P is used to modulate physical subcarrier k(i), $1 \leq k(i) \leq N_{FFT}$, the complex baseband signal for the time domain signal of P can be:

$$Q = \sum_{i=1}^{N_{used}} p_k e^{j2\pi k(i)\Delta f t} \quad (2)$$

The amble sequence P can be known to (recognizable by) both the legacy and any new devices, such as BS 102, RS 104 (e.g., an RS new device) and/or MS 106. According to an aspect of an embodiment, the legacy amble sequence has been chosen based on some consideration, such as low peak-to-average-power-ratio (PAPR) and/or low cross-correlation. In an OFDM/OFDMA based system, a device (legacy or new types) may locate the location of the amble sequence by computing the cross-correlation of its received signal r(t) and $r(t+T_f)$, where $T_f$ is the repeating period of the transmitted preamble sequence (frame length of preamble is sent in every frame) and finding the correlation peak can be expressed by Equation (3):

$$\max_t |\int_T r(t+\tau) \cdot r^*(T_f+\tau+t)d\tau| \quad (3)$$

According to an aspect of an embodiment, a cross-correlation locating an amble sequence refers to when a device (e.g., MS 106, RS 104) recognizes the amble sequence appearing at every frame at a fixed or known location, the amble being substantially identical in every frame. The device performs a cross-correlation based upon collecting wireless signal samples at time windows of same size (a time window has a length of the amble sequence) but at different times (for example, adjacent downlink/uplink communication frames) and multiplying the complex conjugate samples. According to an aspect of an embodiment, the sample frames are not limited to adjacent frames, but can be averaged over any number of adjacent frames. In other words, the samples are collected from times that are frame-duration apart, and the device adjusts or gradually shifts its time window until it detects a strong correlation peak, when the ambles fall into the correlation window. This process takes advantage of the fact that the amble sequence is repeated periodically. Further signal processing is required to determine which amble sequence is sent from the set of all the defined sequences. In other words, a strong correlation peak among a number of frames might only indicate a possible received amble sequence, by being substantially identical, however, the device cannot distinguish which amble sequence has been sent from among a set of amble sequences known by the device until further signal processing against amble sequences known to the device—e.g., stored in computer readable media by the device. Amble sequence cross-correlation can be performed by any of the wireless communication devices during uplink or downlink frame communication (as the case may be). Thus, if a new amble sequence is introduced, existing devices may lock onto the new amble sequence by using the previous described scheme, perform further processing to distinguish the new amble sequence, but determine the new amble sequence is not known or needed, prolonging unnecessarily its time to get synchronized with the network.

Although one example embodiment is described based upon an MMR cell 100, the embodiments are not limited to such a configuration and can be for any wireless communication network using ambles for network identification and/or synchronization. According to an aspect of an embodiment, a plurality of amble sequences can be constructed and broadcasted by any wireless communication device that establish network time and/or frequency references, from among which a first set of devices cannot lock onto but another set of device can lock onto. For example, if a first set of device can detect a first amble sequence, when the first set of device aligns its time windows with a received signal sample including a second amble sequence, the first set of device does not detect a strong cross-correlation peak or in one embodiment finds substantially zero (including zero in the range) cross-correlation peak with the second amble sequence, thus the second amble sequence is transparent to the first set of device. However, a second set of devices can be programmed to locate and detect the first amble sequence, the second amble sequence, or any combinations thereof.

Figure 2A:
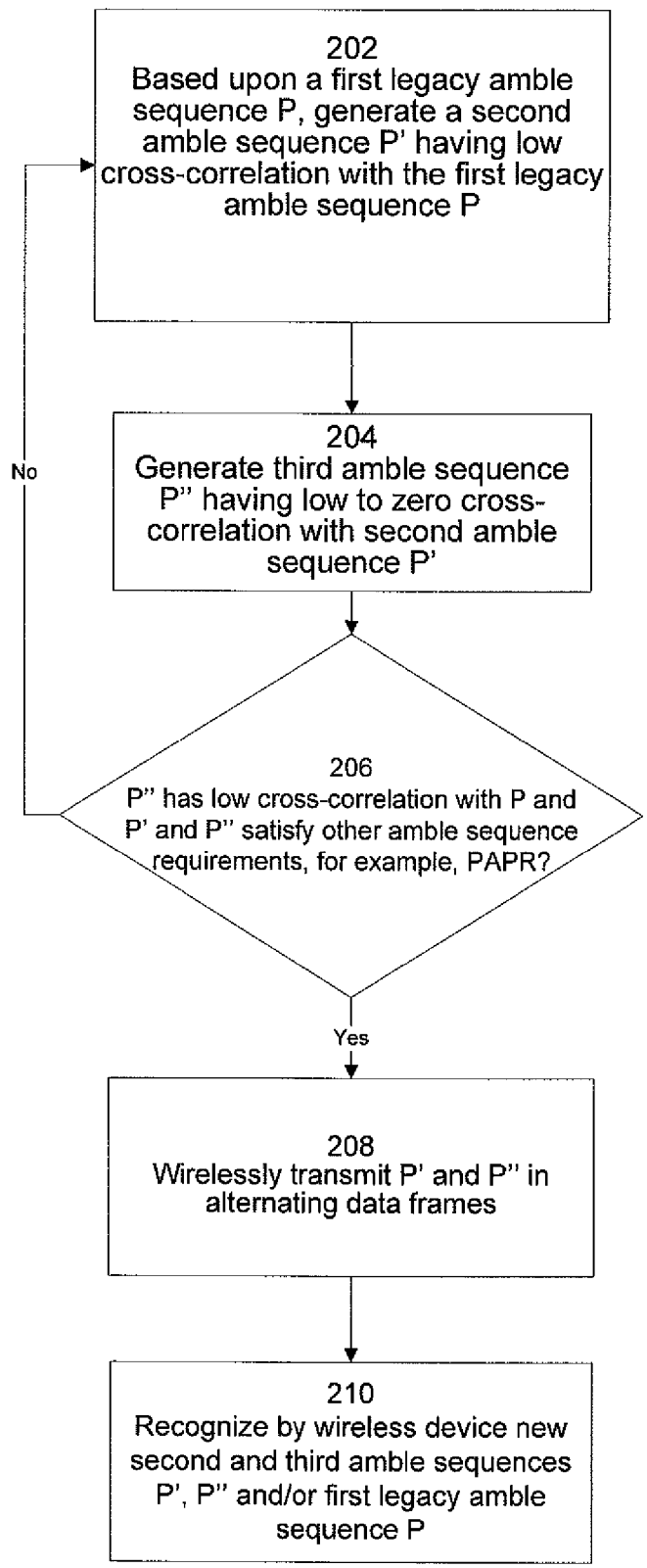
FIG. 2A is a flow chart of generating a new wireless device amble, according to an embodiment.

In a wireless communication network, a new preamble might need to be generated for any new devices introduced in the wireless communication network, such as (without limitation) an RS 104 providing an MMR-cell 100, to get time and frequency synchronization with the new device while coexisting with the legacy preamble in the same network. According to an aspect of an embodiment, in the MMR-cell 100, a new amble sequence (RS synchronization amble in a data frame) is constructed for the RS, which is sent (without limitation) by a BS 102 and/or a master RS 104 and recognizable by the RSs 104, including a slave RSs 104 (i.e., a master RS to other RSs link(s) exist), and transparent to MSs 106 as existing or legacy devices. The legacy devices, such as MS 106, might only be designed to synchronize with the legacy preamble and they should not get confused by the new preamble targeted for the RS 104. According to an aspect of an embodiment, a legacy amble sequence, a new amble sequence, or any combinations thereof can be broadcasted by various wireless communication devices. For example, the new and legacy amble sequences can be broadcast by the BS 102 or other devices (as the case may be). According to an aspect of an embodiment, a new amble, such as a new preamble, is generated in such a way that the new preamble is invisible to the legacy devices and only visible to the new devices, as follows:

FIG. 2 is a flow chart of generating a new wireless device amble, according to an embodiment. At 202, a second amble sequence P' of length $N_{used}$ having a low cross-correlation with the first legacy amble sequence P is found (established or generated) according to known techniques:

$$P'=[p'_1, \ldots, p'_i, \ldots, p'_{N_{used}}], \quad (4)$$

Other requirements may be considered when P' and P''' (described below) are generated, such as peak-to-average-power ratio (PAPR) of the amble signal. P' and P''' need to satisfy these other requirements as well. The length N of sequence P' can be according to application criteria. P' time domain signal is Q'. The cross-correlation between P and P' shall be comparable to the cross-correlation of two random noise sequences of the same length.

At operation 204, a third amble sequence P'' is generated or constructed by reversing (flipping, changing) polarity of one or more components in the second amble sequence P', for example, by flipping polarity of components in the second amble sequence P', for example, by flipping the polarity of alternate bits of the second amble sequence P' as follows:

$$P''=[p''_1, \ldots, p''_i, \ldots, p''_{N_{used}}], \quad (5)$$

$$p''_i = (-1)^i p'_i, \ 1 \leq i \leq N_{USED} \quad (6)$$

Flipping the polarity of $p'_i$ refers to reversing its sign. For example, at operation 204, with Equation (7), the polarity of alternate bits of the amble sequence P' is flipped to generate P''. For example, at operation 204, the polarity of every other bit can be flipped. In case of changing the polarity of alternating bits of the second amble sequence P', the third amble sequence P'' can have substantially low to zero cross-correlation with the second amble sequence P'. The cross-correlation between P' and P'' is $$<P', P''> = \quad (7)$$
$$\int_T Q'(\tau) Q''^*(\tau) d\tau = \sum_{i=1}^{N_{USED}} \sum_{i'=1}^{N_{USED}} p'_i p''^*_{i'} \int_T e^{j2\pi \Delta f \tau (k(i)-k(i'))} d\tau =$$
$$T \sum_{i=1}^{N_{USED}} p'_i p''_i = T \sum_{i=1}^{N_{USED}} (-1)^i = \begin{cases} 0, & \text{when } N_{USED} \text{ is even;} \\ T, & \text{when } N_{USED} \text{ is odd.} \end{cases}$$

According to another embodiment, at operation 204, P''' can be constructed by multiplying every bit with an independent and identically distributed random variable, for example, with discrete value $\{-1,+1\}$ generated with equal probability. For example, P''' can be generated by Equation (8), where $l_i$ is an Identical Independent Distribution (i.i.d.) discrete random variable taking value of $\{-1,+1\}$ with probability of 0.5.

$$p'''_i = l_i p'_i, \ 1 \leq i \leq N_{USED} \quad (8)$$

Equation 9 establishes that signals P' and P''' also have very low or zero cross-correlation when using Equation (8) based upon a random variable generated with equal probability. A verification whether P' and P''' have a low cross correlation operation might be needed. The time domain signal of P''' is Q'''. When Equation (8) is used to generate the sequence P''', $$E(<P', P''>) = E\left(\int_T Q'(\tau)Q''^*(\tau)\,d\tau\right) = \qquad (9)$$

$$\sum_{i=1}^{N_{USED}} \sum_{i'=1}^{N_{USED}} E\left(p'_i p''^*_{i'} \int_T e^{j2\pi\Delta f\tau(k(i)-k(i'))}\,d\tau\right) =$$

$$T\sum_{i=1}^{N_{USED}} E(p'_i p''_i) = T\sum_{i=1}^{N_{USED}} E(l_i) = 0.$$

Figure 2B:
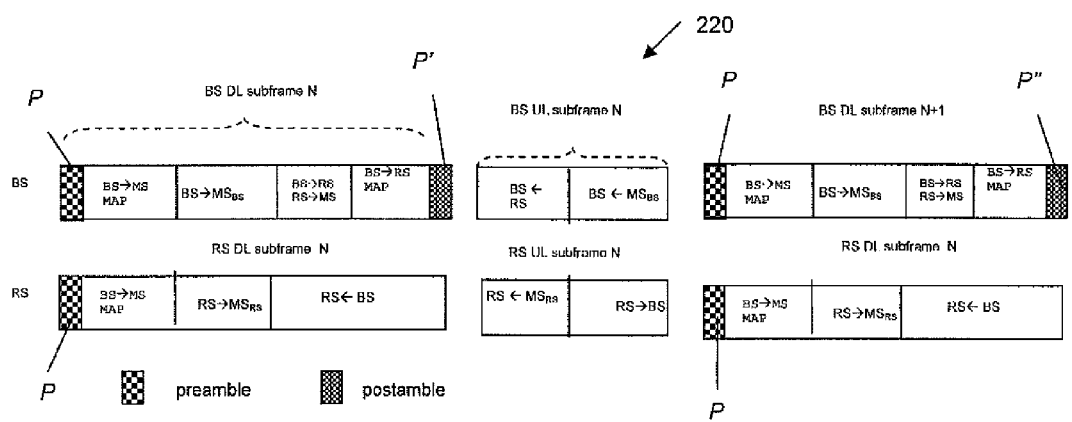
FIG. 2B is a diagram of data frames in the MMR-cell, according to an embodiment.

Operation 206 verifies whether P''' also has low cross-correlation with P and whether P' and P''' satisfy other requirements (an example of such requirements may be that the peak-to-average-power ratio of the signal is below some threshold). According to an aspect of an embodiment, operation 206 can be optional, because P' has a low cross-correlation with P and P' and P''' have a low cross-correlation. If any requirements of operation 206 are not met, then operations 202-206 can be repeated by finding at operation 202 another amble sequence P' having a low cross-correlation with P. According to an aspect of an embodiment, if, at operation 206, the requirements of P' and P''' are all met, at operation 208 a wireless device, such as a BS can transmit the second and third amble sequences P', P''' as a pair in alternating frames or other periods necessary for the synchronization process. For example, a wireless device can wirelessly transmit P' in even-numbered frames and P''' in odd-numbered frames of a wireless communication network, for example, in a downlink communication (or uplink communication as the case may be), because P' and P''' have substantially low to zero cross-correlation, such that a legacy device (MS 106) searching for an amble sequence by doing cross-correlation between signals in adjacent frames (i.e., the legacy devices cross-correlate on received signal samples r(t) and r(t+T)) will not observe a correlation peak or detect P' and P'''. FIG. 2B is a diagram of data frames in the MMR-cell, according to an embodiment. In FIG. 2B, at operation 208, in downlink communication link data frames (downlink/uplink subframes) 220, P' and P''' amble sequences as postambles are transmitted in alternate frames. The embodiments are not limited to FIG. 2B, and P' and P''' can be preambles, midambles, and/or postambles, transmitted and recognized by various wireless communication devices, while invisible to other wireless communication devices like legacy MS 106.

At operation 210, one example way a new device can achieve synchronization with the BS is by performing cross-correlation of its received signal r(t) with r(t+2T$_f$) and allocating the correlation peak:

$$\max_i |\int_T r(t+\tau) \cdot r^*(2T_f+\tau+t)\,d\tau| \qquad (10)$$

The new device can further use signal processing to identify the amble pair (P',P'''). For example, in FIG. 2B, this way any desired new device (in this example an RS 104) can recognize the new postambles P' and P''' and sync with them, but a legacy device (for example an MS 106) will not recognize or lock onto the new postambles P' and P''' when the legacy device is conducting search with the process of Equation (3) and continues searching until locking onto legacy or existing preambles P. At operation 210, a way for a new device to locate the positions of the second or third amble sequences is to do cross-correlation of signal samples in two frames apart.

Because a legacy device is not aware of this new amble pair, the legacy device can continue locating the legacy preamble according to Equation (3). In other words, if a legacy device calculates the cross-correlation of its received P' or P''' amble sequences as signal r(t) with its known preamble of P, the legacy device will not observe a strong correlation peak, because of the low cross-correlation between P and P' (or P'''). If the legacy device calculates the autocorrelation of the signals r(t) and r(t+T), the legacy device will not observe a correlation peak if its time window falls onto the preamble P' and P''', because the cross-correlation between P' and P''' is zero or small (T). Either way the legacy devices will not detect the new preamble and will not get confused. One example benefit of the embodiments is non-degraded service provided to the legacy devices as the new type of devices are introduced.

According to an aspect of an embodiment, a new device can detect both the legacy amble and the new amble, and a legacy device can only detect a legacy preamble. For example, a legacy device will only sync with the legacy preamble, and a new device has the choice to sync with either new or the legacy preamble. Although the described embodiment uses a preamble as an example, the embodiment is not limited to such a configuration, and according to an aspect of an embodiment other special periodic symbols can be constructed, such as (without limitation) a midamble, which can be used for device synchronization and channel estimation.

It is an aspect of the embodiments discussed herein to provide new and legacy wireless communication devices coexisting wireless communication amble sequence or synchronization symbol (hereinafter referred to as an amble sequence or simply an amble), broadcasted or transmitted at any fixed or known location with respect to a wirelessly communicated data frame, such as (without limitation) a preamble(s), a midamble(s), a postamble(s), or any combinations thereof.

Figure 3:
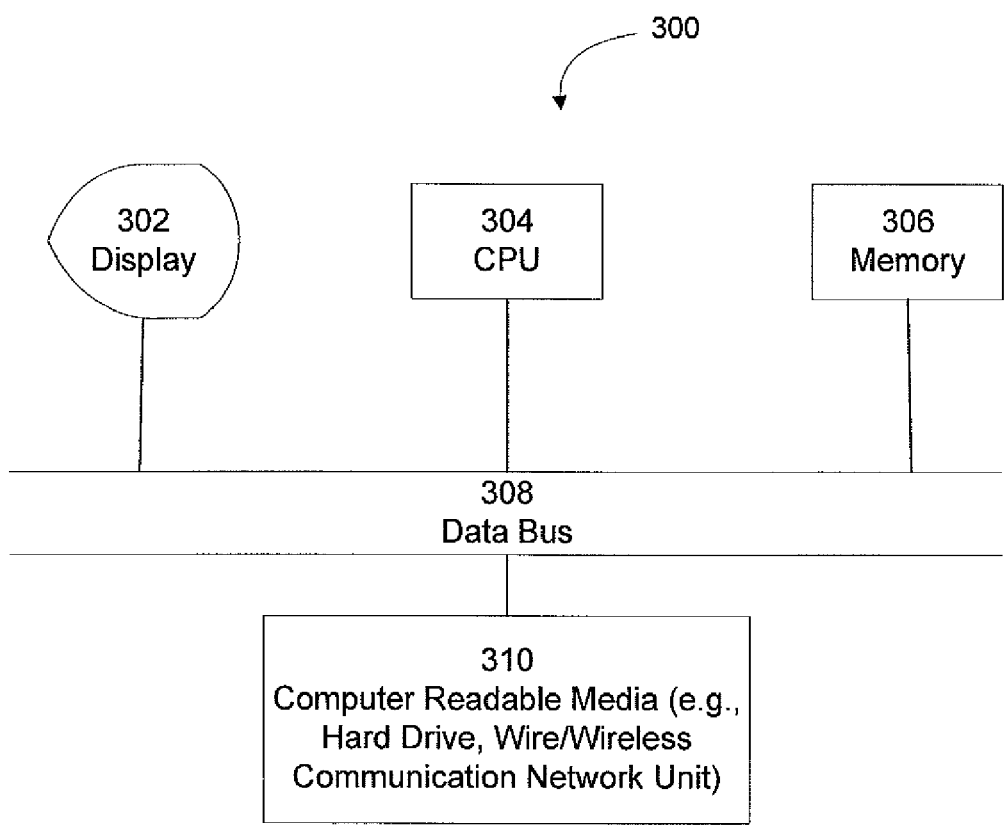
FIG. 3 is a functional block diagram of an apparatus generating an amble sequence according to an embodiment.

FIG. 3 is a functional block diagram of an apparatus generating an amble sequence according to an embodiment. In FIG. 3, the apparatus can be any computing device wireless F broadcasting an amble sequence, for example, (without limitation) functioning or operating as a Base Station 102. Typically, the apparatus 300 includes a display 302 to display a user interface. A controller 304 (e.g., a central processing unit) executes instructions (e.g., a computer program or software) that control the apparatus to perform operations. Typically, a memory 306 stores the instructions for execution by the controller 304. According to an aspect of an embodiment, the apparatus is in communication with any computer readable media 310, such as (without limitation) physical computer readable recording media (e.g., a hard drive, memory), or wire/wireless communication network unit(s) implemented in software and/or computing hardware communicating via wire/wireless carrier wave signals. According to an aspect of an embodiment, the apparatus 302 is in wireless communication with a target wireless communication network, such as (without limitation) MMR-cell 100. The display 302, the CPU 304, the memory 304 and the computer readable media 310 are in communication by the data bus 308.

Figure 4:
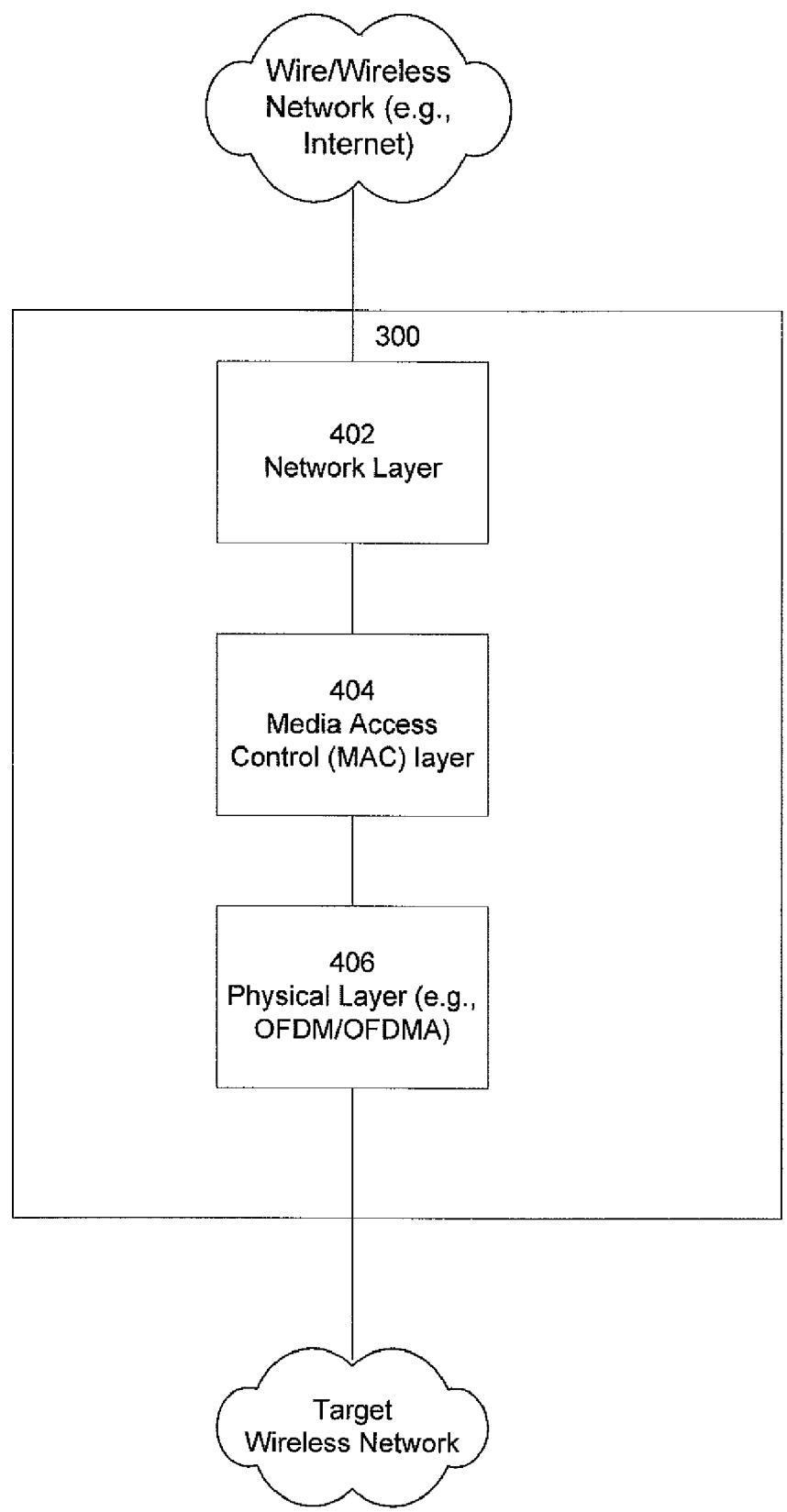
FIG. 4 is a functional diagram of processing layers (software and/or computing hardware) in the apparatus of FIG. 3, according to an embodiment.

FIG. 4 is a functional diagram of processing layers (software and/or computing hardware) in the apparatus of FIG. 3, according to an embodiment. In FIG. 4 the processing layers comprise a network layer 402, a Media Access Control (MAC) layer 404 and a physical layer 406. FIG. 4 processing layers are logical layers, and the embodiments are not limited to these example processing layers and other processing layer configurations may be provided. According to an aspect of an embodiment, the network layer 402 is software executed by the controller 304. The MAC 404 and physical layers 406 are software and/or computing hardware as the wireless communication network unit 310. The embodiments generating legacy/new wireless communication device coexisting amble sequences can be software (as stored or encoded on any known computer readable media 310, such as computer readable recording medium, without limitation, a compact disk, a Digital Versatile Disc (DVD), memory, or communication media, such as carrier wave or electromagnetic signals, etc.) and/or on any computing hardware. The embodiments generating a legacy/new device coexisting amble sequences P' and P''' can be included in the MAC layer 404 with the physical layer 406, transmitting and/or receiving (searching for) the coexistable amble sequences P' and P''', in target wireless network nodes, for example, in a BS 102 and/or RS 104. In FIG. 4, typically (without limitation) the network layer 403 provides wire and/or wireless communication access to private/public network(s) (e.g., Internet) other than the target wireless network, for example (without limitation) MMR-cell 100. The network layer 403 can be used for management functions, such as configuration/parameter set up of the BS 102, including a download of embodiments in case of software, download of amble sequence P known by the BS 102, and/or download of generated new amble sequences P' and P'''.

According to an aspect of an embodiment, a new type of amble sequence for wireless communication network with mixed nodes is constructed. According to an aspect of an embodiment, the new amble sequence is visible to some nodes while invisible to other nodes. According to an aspect of an embodiment, the new amble sequence comprises two or more amble sequences. In other words, a wireless communication device is programmed to detect the new amble sequence by cross-correlating in two or more frames apart. One embodiment provides a new amble sequence comprising paired amble sequences by generating a first amble sequence invisible to a first node based upon an existing amble sequence for the first node and generating a second amble sequence having a low to zero cross-correlation with the first amble sequence, based upon the first amble sequence; and broadcasting the first and second amble sequence as a pair in alternating communication link frames. In case of paired amble sequences P', P''', a device can cross-correlate based upon two frames apart to recognize P', P''' pair on received signals comprising alternating P', P''', P', P'''. According to an aspect of an embodiment, operations 202-206 can be performed on a need basis, for example, upon introduction of a new wireless communication device, and thereafter operations 208-210 are performed to conduct wireless communication according to application. However, the embodiments are not limited to such a configuration, and operation 202-206 can be performed dynamically (real-time) according to application criteria.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A method of generating an amble sequence in a wireless communication network having a first amble sequence, comprising:
generating a second amble sequence in a frequency domain having a low cross-correlation with the first amble sequence;
generating a third amble sequence based upon the second amble sequence and having a substantially low to zero cross-correlation with the second amble sequence;
transmitting a pair of the second and third amble sequences with each amble sequence of the pair in an alternating frame of the wireless communication network.

2. The method of claim 1, wherein the generating of the third amble sequence comprises flipping signs of one or more components in the second amble sequence.

3. The method of claim 2, wherein the flipping of the signs of the component of the second amble sequence comprises flipping the signs of alternating components of the second amble sequence, or flipping the signs of the components of the second amble sequence following a random variable, or any combinations thereof.

4. The method of claim 3, wherein the signs of the components of the second amble sequence is randomly changed according to a discrete random sequence of $\{-1, +1\}$ generated independently with equal probability.

5. The method of claim 1, further comprises verifying whether the third amble sequence has a low cross-correlation with the first amble sequence.

6. The method of claim 1, wherein:
the wireless communication network is a WiMAX Mobile Multi-hop Relay-Based network comprising one or more base station, one or more relay stations, and one or more mobile stations, and
the first amble sequence is transmitted by the base stations and recognizable by the relay stations and the mobile stations, and
the second and third amble sequences are transmitted by the base stations and only recognizable by the relay stations.

7. The method of claim 1, further comprising detecting the second and third amble sequences by cross-correlating a received signal sample two frames apart corresponding to the alternating frames.

8. The method of claim 7, wherein the first, second, and third amble sequences are based upon Orthogonal Frequency Division Multiplexing wireless communication systems.

9. A method of generating a new type of amble sequence for a wireless communication network with mixed nodes, comprising:
generating, based upon an existing amble sequence for a first node, a first amble sequence invisible to the first node;
generating a second amble sequence having a low to zero cross-correlation with the first amble sequence, based upon the first amble sequence; and
broadcasting a pair of the first and second amble sequences with each amble sequence of the pair in an alternating communication link frame or other duration necessary for network synchronization.

10. The method of claim 9, wherein the generating of the second amble sequence comprises flipping signs of one or more components in the first amble sequence.

11. The method of claim 10, wherein the flipping of the signs of the components of the first amble sequence comprises flipping the signs of alternating components of the first amble sequence, or flipping the signs of the components of the first amble sequence following a random variable, or any combinations thereof.

12. The method of claim 9, wherein the wireless communication network wirelessly communicates based on Orthogonal Frequency Division Multiplexing and the first node is a mobile or portable station.

13. The method of claim 12, wherein the wireless communication network is a WiMAX Mobile Multi-hop Relay-Based network comprising one or more base stations and one or more relay stations to one or more of the mobile or portable stations, and the existing amble sequence is transmitted by the base stations and recognizable by the relay stations and the mobile or portable stations, and the first and second amble sequences are transmitted by the base station and visible to the relay stations and invisible to the mobile or portable stations.

14. An apparatus, comprising:

a computer readable recording medium storing a wireless communication first amble sequence; and a controller generating a second wireless communication amble sequence in a frequency domain having a low cross-correlation with the first wireless communication amble sequence, generating a third wireless communication amble sequence based upon the second amble sequence and having a low cross-correlation with the second wireless communication amble sequence, and transmitting a pair of the second and third wireless amble sequences with each amble sequence of the pair in an alternate frame.

15. The apparatus of claim 14, wherein the generating of the third amble sequence comprises flipping signs of one or more components in the second amble sequence.

16. The apparatus of claim 15, wherein the flipping of the signs of the components of the second amble sequence comprises flipping the signs of alternating components of the second amble sequence, or flipping the signs of the components of the second amble sequence following a random variables, or any combinations thereof.

17. The apparatus of claim 16, wherein the signs of the components of the second amble sequence is randomly changed according to a discrete random sequence of $\{-1, +1\}$ generated independently with equal probability.

18. The apparatus of claim 14, wherein the controller further verifies whether the third amble sequence has a low cross-correlation with the first amble sequence.

19. The apparatus of claim 14, wherein the controller wirelessly communicates in a WiMAX Mobile Multi-hop Relay-Based wireless communication network to one or more relay stations and/or one or more mobile stations, and the first amble sequence is recognizable by the relay stations and the mobile stations, and the second and third amble sequences are recognizable by the relay stations and invisible to the mobile stations.

20. The apparatus of claim 19, wherein the first, second, and third amble sequences are based upon Orthogonal Frequency Division Multiplexing wireless communication systems.

\* \* \* \* \*

UNITED STATES PATENT AND TRADEMARK OFFICE
CERTIFICATE OF CORRECTION

PATENT NO.        : 8,054,817 B2                                                Page 1 of 1
APPLICATION NO.   : 11/830929
DATED             : November 8, 2011
INVENTOR(S)       : Chenxi Zhu et al.

It is certified that error appears in the above-identified patent and that said Letters Patent is hereby corrected as shown below:

On the title page, above item [74] Delete "Alexander Boayke" and insert -- Alexander Boakye --, therefor.

Signed and Sealed this
Twenty-fourth Day of January, 2012

David J. Kappos
*Director of the United States Patent and Trademark Office*